United States Patent [19]

Asada et al.

[11] Patent Number: 4,803,519
[45] Date of Patent: Feb. 7, 1989

[54] ELECTROPHOTOGRAPHIC COPYING MACHINE WITH DOCUMENT-WINDING DRUM AND DOCUMENT TABLE

[75] Inventors: Atsushi Asada; Shunju Anzai, both of Nara, Japan

[73] Assignee: Sharp Kabushiki Kaisha, Osaka, Japan

[21] Appl. No.: 134,203

[22] Filed: Dec. 16, 1987

Related U.S. Application Data

[63] Continuation of Ser. No. 711,822, Mar. 14, 1985, abandoned.

[30] Foreign Application Priority Data

Mar. 15, 1984 [JP] Japan .................................. 59-50721

[51] Int. Cl.⁴ ............................................. G03G 15/04
[52] U.S. Cl. ..................................... 355/8; 355/35 H; 355/51
[58] Field of Search ............. 355/3 R, 35 H, 8, 48–51, 355/75; 361/234

[56] References Cited

U.S. PATENT DOCUMENTS

| | | | |
|---|---|---|---|
| 3,832,053 | 8/1974 | Goel et al. | 361/234 X |
| 4,113,380 | 9/1978 | Walter | 361/234 X |
| 4,168,905 | 9/1979 | Kitajima | 355/8 X |
| 4,174,904 | 11/1979 | Murasaki et al. | 355/51 X |
| 4,204,730 | 5/1980 | Miyashita et al. | 355/51 X |
| 4,456,369 | 6/1984 | Sato | 355/35 H X |

FOREIGN PATENT DOCUMENTS 1043298 9/1966 United Kingdom ................ 361/234

*Primary Examiner*—Arthur T. Grimley
*Assistant Examiner*—J. Pendegrass
*Attorney, Agent, or Firm*—Birch, Stewart, Kolasch & Birch

[57] ABSTRACT

An electrophotographic copying machine includes a document mount portion, a document-winding drum, and a selection element. A book-like document can be copied when it is mounted on the document mount portion or a sheet-like copy document can be copied by being wound around the document drum by operation of the selection element. The document mount portion and the document drum are positioned within the range of movement of a common light scanning source so that the copy document provided on either the mount portion or the drum is optically scanned with the common light scanning source.

14 Claims, 3 Drawing Sheets

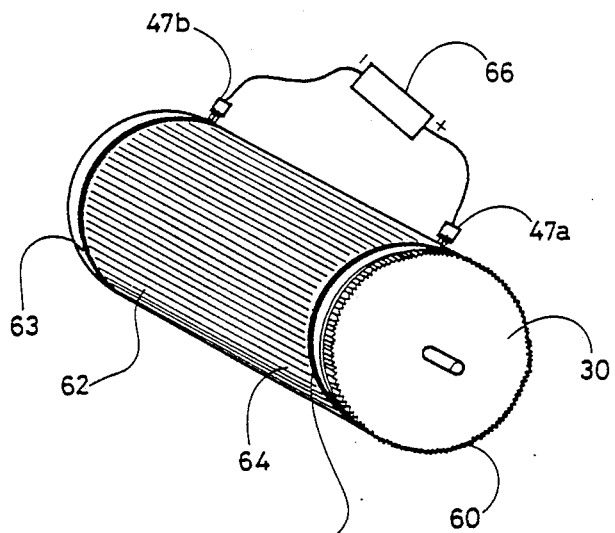
FIG. 3
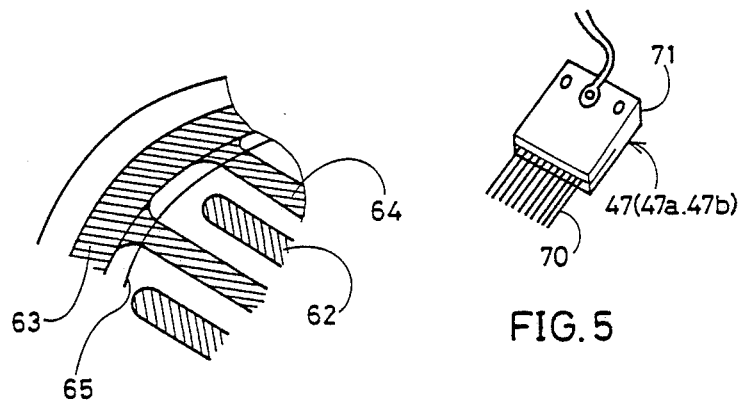
FIG. 4
FIG. 5

ELECTROPHOTOGRAPHIC COPYING MACHINE WITH DOCUMENT-WINDING DRUM AND DOCUMENT TABLE

This application is a continuation of copending application Ser. No. 711,822, filed Mar. 14, 1985, now abandoned.

BACKGROUND OF THE INVENTION

The present invention relates to an electrophotographic copying machine and, more particularly, to a light source reciprocating type electrophotographic copying machine having document-winding drum and document table.

Conventional electrophotographic copying machines are not suitable for copying both a sheet-type document and a book-like document. It is therefore desired to overcome this deficiency and provide such a copying machine.

SUMMARY OF THE INVENTION

Accordingly, it is an object of the present invention to provide an improved electrophotographic copying machine equipped with a document-winding drum in addition to a document table.

It is another object of the present invention to provide an improved electrophotographic copying machine for reciprocating a scanning light source, the copying machine being equipped with a document-winding drum for winding a sheet-like document thereon in addition to a document table for mounting any document thereon.

It is a further object of the present invention to provide an improved combination of a light source-reciprocating type electrophotographic copying machine and a document-winding drum for winding a sheet-like document thereon.

Briefly described, in accordance with the present invention, an electrophotographic copying machine include a common light scanning device for optically scanning a copy a document, document table for mounting a first-type copy document such as a book thereon, a document drum for winding sheet-type paper or document thereon, and a selection device for selectively choosing whether the document on the table or the document on the drum is scanned. The document table means and the document drum are positioned within the range of movement the common light scanning device so that the copy document provided on either of them is optically scanned with the common light scanning device.

BRIEF DESCRIPTION OF THE DRAWINGS

The present invention will become more fully understood from the detailed description give hereinbelow and the accompanying drawings which are given by way of illustration only, and thus are not limitative of the scope of present invention and wherein:

FIG. 3 is a perspective view of the sheet-like document-winding drum of FIG. 2;

FIG. 4 is an enlarged view of part of the sheet-like document-winding drum of FIG. 3; and FIG. 5 is an enlarged view of an electrically conductive brush for the drum of FIG. 3.

DESCRIPTION OF THE PREFERRED EMBODIMENT

Figure 1:
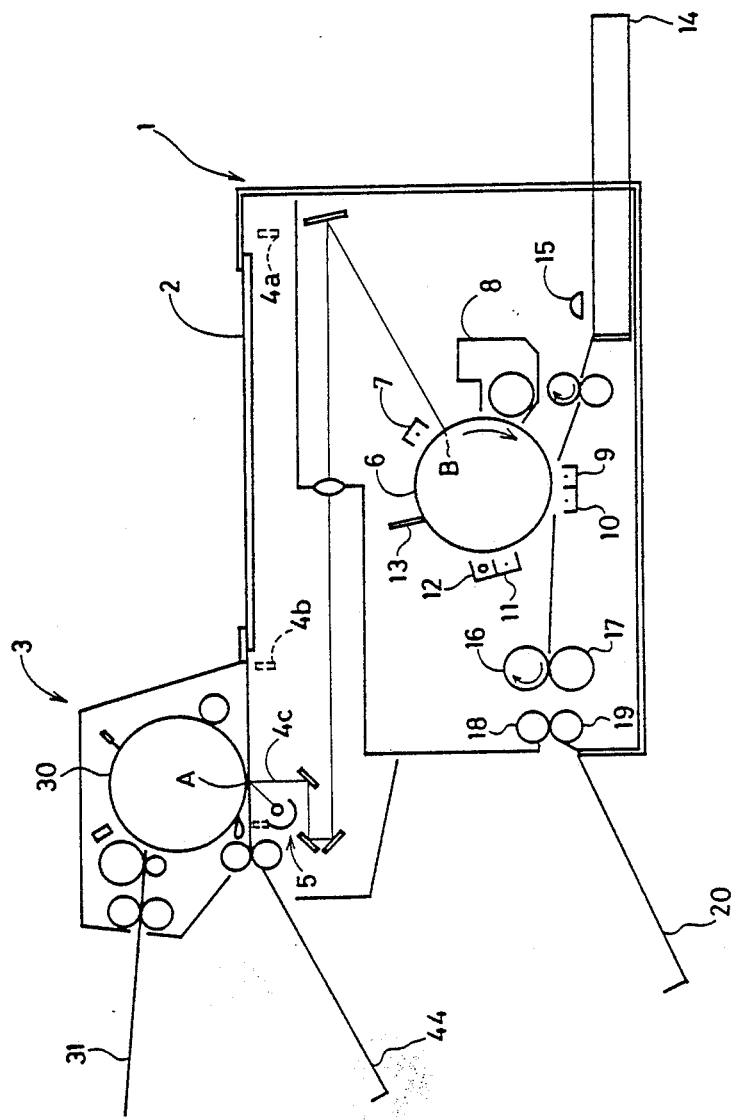
FIG. 1 is a cross sectional view of an electrophotographic copying machine according to the present invention.

FIG. 1 is a cross sectional view of an electrophotographic copying machine according to the present invention.

The body of the copying machine is denoted by 1. A document table plate 2 made of glass is provided for mounting any type of document including a book-like document thereon. A sheet-like document drum unit 3 is provided for receiving a sheet-like document. Under the document table plate 2, two micro-switches 4a and 4b are provided and under the sheet-like document unit 3, a micro-switch 4c is disposed. A reciprocating light source 5 is stopped normally at a home position adjacent micro-switch 4b. To optically scan and copy the document mounted on the document table plate 2, the light source 5 is reciprocated between the positions adjacent micro-switches 4b and 4a. It is returned and stopped at the position of micro-switch 4b. To optically scan and copy the sheet-like document wound in the unit 3, light source 5 is moved from the home position of the microswitch 4b to the position of micro-switch 4c and then stopped. The light-target of the light source 5 is a point A of a sheet-like document-winding drum 30 in the drum unit 3. The document-winding drum 30 is provided for winding a sheet-like document thereon. An automatic document feeder is provided for automatically feeding the sheet-like document into the drum 30. Separation means is provided for separating the sheet-like document from the drum 30. The arrangement of the drum unit 3 will be described in great detail later.

Light from the light source 5 is reflected by the sheet-like document wound on the drum 30. The reflected light is incident on a point B of a photoreceptor drum 6 through an optical system including mirrors and lenses. Around the photoreceptor drum 6, there are in turn provided a charge 7, a developing device 8, a transference charger 9, a separation charger 10, a charge-removing charger 11, a charge-removing lamp 12, and a cleaning blade 13. A paper storing cassette 14 is attached to the body 1 of the copying machine to supply copy papers. A pick-up roller 15 is provided for subsequently picking up a single top copy paper. A pair of feeding rollers are provided for guiding the picked-up paper into the photoreceptor drum 6. When it reaches the transference charger 9, a toner image developed by the developing device 8 is transferred onto the copy paper. The image-transferred paper passes between a fixing roller 16 and a pressing roller 17 in order to fix the image on the paper. The paper is then exhausted on an exhaust tray 20 through a pair of rollers 18 and 19.

As mentioned above, the light source 5 is reciprocated between micro-switches 4b and 4a. It is still at the position of micro-switch 4c while scanning the sheet-like document wound on the drum 30. The movement of the light source 5 is controlled by a microcomputer. A mode selection switch is provided for selecting either the first mode for optically scanning the document mounted on the table plate 2 and the second mode for optically scanning the sheet-like document wound on the drum 30. This mode selection switch is disposed on a control panel on the top of the body 1.

As shown in FIG. 1, the drum unit 3 is positioned at the position corresponding to the end portion of the zone of the reciprocating light source 5. The drum position cannot disturb the mounting of a massive document like a book on the table plate 2.

Figure 2:
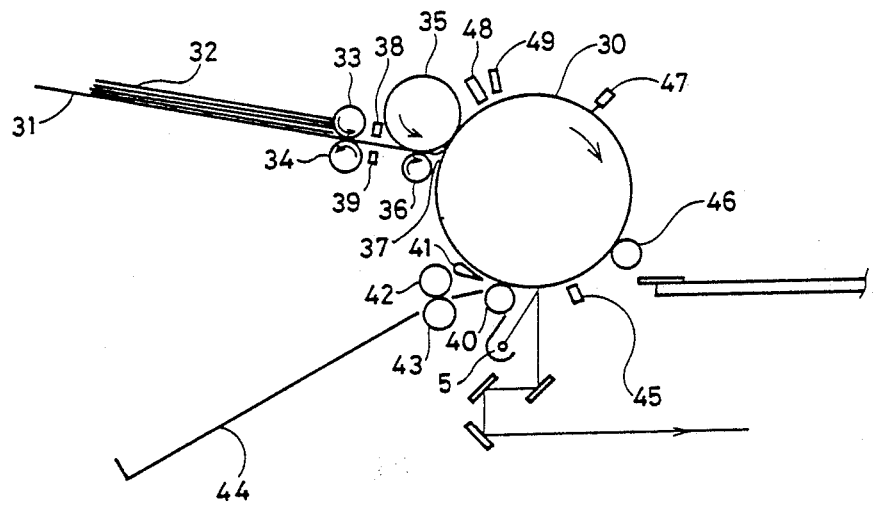
FIG. 2 is a cross sectional view of a sheet-like document drum unit including a sheet-like document-winding drum for the copying machine of FIG. 1.

FIG. 2 is a cross sectional view of the drum unit 3. The automatic sheet-like document feeding roller mechanism is provide for automatically feeding each bottom document from a plurality of sheet-like documents mounted on a document tray 31 into the document drum 30. This mechanism includes an upper roller 33, a lower roller 34, a first guide roller 35, and a lower guide roller 36. The four rollers 33 through 36 are driven with chain means from the body 1 of the copying machine. The upper roller 33 and the lower roller 34 are rotated in the opposite direction to prevent two or more sheets of documents from being inserted. The single bottom document is forwarded into the document drum 30, being grasped by the first guide roller 35 and the second guide roller 36. A document guide portion 37 is secured at the outlet between the rollers 35 and 36. The tip of the document guide portion 37 is curled up toward the tangential direction of the document drum 30. With this guide portion 37, the document passing through the gate between the rollers 35 and 36 can be wound by the document drum 30. A phototransistor 38 is interposed between the rollers 33 and 35 while a light emitting diode (LED) 39 is interposed between the rollers 34 and 36 to confront the phototransistor 38. The combination of the phototransistor 38 and the LED 39 detects the presence of the front portion of the traveling document, so that they can enable the starting of the application of a DC voltage to an electrode brush, as will be described later.

As the device for separating the wound document from the document drum 30, there is provided a third guide roller 40, a document separation claw 41, an upper document exhaust roller 42, and a lower document exhaust roller 43. The document separation claw 41 is controlled so that it can attach to and separate from the document drum 30, selectively. To separate the wound document from the document drum 30, the claw 41 contacts the surface of the document drum 30. The front portion of the wound document is thus separated from the document drum 30 by the document separation claw 41. The separated document is carried by the upper exhaust roller 42 and the lower document exhaust roller 43 to finally be exhausted on a document exhaust tray 44. When the tip of the document separation claw 41 nears the wound document, it contacts the surface of the document drum 30 so as not to damage the surface thereof. A phototransistor 45 is positioned on the former side of the third guide roller 40 along the rotation direction of the drum 30 as as to detect the front portion of the wound document, whereby the movement control of the document separation claw 41 is possible. That is, after the phototransistor 45 detects the front portion of the wound document and it passes at a necessary time for the front portion to travel near the third guide roller 40, the edge of the document separation claw 41 becomes close to the surface of the document drum 30. The light source 5 also serves to activate the mode of the phototransistor 45. In the case of an automatic light exposure control type copying machine in which the brightness of the light source 5 is automatically controlled depending on the shade of the sheet-like document, the phototransistor 45 for detecting the front portion of the wound document can serve to detect the shade of the document. The three rollers 40, 42, and 43 are driven with a driving force from the copying machine.

An LED 48 and a phototransistor 49 are provided for detecting the front portion of the wound document 32. A second guide roller 46 is positioned on the former side along the rotation direction of the document drum 30 adjacent the phototransistor 45. An electrode brush 47 is positioned between the second guide roller 46 and the phototransistor 49. The electrode brush 47 applies serves to apply a DC voltage to a plurality of electrodes disposed on the surface of the document drum 30. When the wound document is separated from the document drum 30, the DC voltage supply to the plurality of electrodes is stopped in synchronization to the time when the document separation claw 41 is in contact with the surface of the document drum 30. When the document separation claw 41 separates the wound document from the document drum 30, the separated front portion of the document is supported by the document drum 30 and the third guide roller 40 while the rear portion of the document is supported by the document drum 30 and the second guide roller 46, so that the document is prevented from floating far from the document drum 30.

The light source 5 is illuminated when the phototransistor 49 detects the front portion of the document wound on the document drum 30. Sometime after the phototransistor 45 detects the front portion of the wound document, the copy paper is picked up from the paper cassette 14 and forwarded. The time when the front portion of the copy paper reaches the transference position after the detection of the front portion of the document by the phototransistor 45 is equal to the time when the image of the light exposure position becomes imaged by the photoreceptor 6 and forwarded into the transference position after the front portion of the wound document passes adjacent the phototransistor 45. Thus, the front portion of the document wound on the document drum 30 is moved completely synchronized with the movement of the front portion of the copy paper. Because the electrode brush 47 applies DC voltage to the plurality of electrodes on the surface of the document drum 30, the document is electrostatically attracted by the electrodes and tightly wound on the document drum 30. The amount of the DC voltage to be applied to the electrodes is selected so that the wound document cannot be distorted on or separated from the document drum 30 due to friction with the rollers. With the help of the electrostatic attraction force, the wound document is stably rotated to the light exposure position A with the rotation of the document drum 30. To separate the wound document from the document drum 30 after the light exposure, the voltage supply from the electrode brush 47 is stopped at the time when the front portion of the wound document passes near the position of the third guide roller 40 after the detection of the front portion of the wound document by the phototransistor 45. Further, the document separation claw 41 contacts the surface of the document drum 30, for a short period of time. Thus, the front portion of the wound document is separated from the surface of the document drum 30. The second guide roller 46 and the third guide roller 40, being in close contact with the document drum 30, can prevent the document from being far from the document drum 30.

FIG. 3 is a perspective view of the document drum 30, showing the structure of the plurality of electrodes arranged on the surface of the drum 30.

The document drum 30 is formed of a synthetic resin. A gear 60 is formed at an end of the drum 30 over its peripheral portion. The gear 60 can be engaged with the second guide roller 46 and the third guide roller 40. Because these rollers 40 and 46 are rotated by a driving force from the body 1 of the copying machine, the engagement of the gear 60 with the rollers 40 and 46 permits the drum 30 to be rotated also. The diameters of the rollers 40 and 46 are so selected that the peripheral speed of the photoreceptor drum 6 equals that of the document drum 30. Each of positive and negative electrodes, as the plurality of electrodes, alternatively and longitudinally extends from each of two edges of the drum 30. That is, the positive electrodes are composed of a positive electrode terminal 61 and a plurality of positive interdigital electrodes 62. The positive electrode terminal 61 is positioned at one end of the document drum 30. The plurality of positive interdigital electrodes 62 extend from the positive electrode terminal 61 to the curved surface of the drum 30. The plurality of negative electrodes are composed of a negative electrode terminal 63 and a plurality of negative interdigital electrodes 64. The negative electrode terminal 63 is positioned at the other end of the drum 30. The plurality of negative interdigital electrodes 63 extend from the negative electrode terminal 63 to the curved surface of the drum 30. The plurality of positive and negative interdigital electrodes 62 and 64 are alternatively positioned along the curved surface of the drum 30 with an adequate space. These positive and negative electrodes are printed.

FIG. 4 is an enlarged view of portions of the positive and negative electrodes 62 and 64.

As FIG. 4 shows, these positive and negative electrodes 62 and 64 are coated with a resin layer 65 made of, for example, polytetrafluoroethylene (Teflon). The resin layer 65 coats the electrode portions other than the positive and negative electrode terminals 61 and 63. Although FIG. 4 indicates that the electrodes 62 and 64 are visible through the resin layer 65, actually, the resin layer 65 made of Teflon is not transparent so the electrodes 62 and 64 cannot be viewed from the outside through the Teflon layer 65. By coating the electrodes 62 and 64 with the resin layer 65, no current can leak on the surface of the document drum 30, the dielectric property can be assured, and no static electricity can be generated due to the friction of the wound document with the rollers.

Turning back to FIG. 3, the electrode brush 47 for supplying the DC voltage to the positive and negative interdigital electrodes includes a positive electrode brush 47a electrically coupled to the positive electrode terminal 61 and a negative electrode brush 47b electrically coupled to the negative electrode terminal 63. These positive and negative brushes 47a and 47b are fixed to the surface of the document drum 30. They receive electric power from a DC voltage source 66 which is turned ON/OFF by the microcomputer.

FIG. 5 is an enlarged view of the electrode brush 47a or 47b.

Each of the electrode brushes 47a and 47b includes an electrode plate 71 made of, for example, aluminum and a plurality of electrically conductive flexible fibers 70 bound by the plate 71. The plurality of electrically conductive flexible fibers 70 are composed of a low resistance material containing carbon fibers. With the electrically conductive flexible fibers, the electrode brushes 47a and 47b can be combined with the electrode terminals 61 and 63 very smoothly.

The sheet-like document-winding drum 30 is thus constructed. The operation of the copying machine will be described as follows.

I. Book-Like Document Copy Mode With The Table Plate 2

When the mode selection switch on the control panel of the copying machine is operated to select a mode for copying a document mounted on the table plate 2, the document mounted on the table plate 2 is optically scanned. The light source 5 is moved from the home position adjacent micro-switch 4b to the position of micro-switch 4a. The document mounted on the table plate 2 is thereby scanned. The copy and transference operation for the document are thereafter carried out.

II. Sheet-Like Document Copy Mode With The Document Drum Unit 3

When the mode selection switch is operated to select the mode for copying a sheet-like document with the drum unit 3, the light source 5 is moved from the home position to the position adjacent the micro-switch 4c and stopped. The light source 5 remains still before the copy operation using the document drum unit 3 has been completed. One or more documents 32 are placed on the document tray 31. In response to the actuation of a copy start switch, the feed rollers 33 and 34 are rotated to forward a single bottom sheet-like document. When the phototransistor 38 detects the front portion of the forwarded document, the detection signal is inputted into the microcomputer, so that the electrode brush 47 receives a DC power voltage. Therefore, an electric field is induced on the surface of the document drum 30. The document travels with the guide rollers 35 and 36, and the document guide 37 into the document drum 30. When the phototransistor 49 detects the front portion of the forwarded document, the light source 5 is illuminated. Due to the attraction force by static electricity, the document is attracted to the document drum 30 while continuing to be wound. When the phototransistor 45 senses the front portion of the wound document, the paper cassette 14 is operated to supply a copy paper after a predetermined time.

When a single copy mode wherein a single copy is to be prepared is desired, the document separation claw 41 contacts the surface of the document drum 30 in another predetermined time after the detection of the front portion of the wound document by the phototransistor 45. At the same time, the document drum 30 is prevented from receiving the DC voltage. Therefore, the front portion of the wound document can be easily detached from the document drum 30 by the separation claw 41. The separated document is grasped by the exhaust rollers 42 and 43 to be thereby exhausted on the tray 44. Since the document drum 30 is rotated in unison with the photoreceptor 6, the image on the document can be light exposed on the photoreceptor drum, 6, exactly.

When a multicopy mode for preparing a plurality of copies of a single document is selected, the document separation claw 41 remains to the surface of the document drum 30 as indicated in the solid line of FIG. 2. The supply of the DC voltage to the document drum 30 is continued. The wound document is rotated by the number of the multicopy as being wound on the drum 30. Thus, the light scanning to the document wound on the drum 30 is quick in the multicopy mode also. To finish the multicopy mode in connection with this wound document, the document separation claw 41 contacts the surface of the document drum 30.

The arrangement of the present invention can afford the following advantages:

(1) Since the flat table plate 2 and the document drum unit 3 are positioned within the range of movement of the light source 5, the light source can optically scan the document provided with either of them. The cost of operation therefore becomes small. A single copying machine can copy the book-type document with the flat table plate 2 and the sheet-like document with the document drum unit 3.

(2) Since the document drum unit 3 is positioned at the end of the range of movement of the light source 5, it is unnecessary to replace the drum unit 3 in order to make a copy using the flat table plate 2.

(3) The document can be wound around the document drum 30 due to static electricity. No claws for winding the document around the drum 30 are needed. There is no danger that claws can shade a portion of the image on the wound document.

(4) Without any claws for binding the document on the document drum 30, no means for releasing the binding by such claws are is needed either. Any synchronization between such a claw means and release means is unnecessary so that the document can be wound around the document drum 30 quickly. Further, the positions of the front portion of the wound document are optically detected so that any mis-synchronization can be prevented.

(5) The interdigital electrodes 62 and 64 are printed so that their fabrication is very easy. Because the electrode brush 47 has electrically conductive low resistance fibers, their contact is very good.

While only certain embodiments of the present invention have been described, it will be apparent to those skilled in the art that various changes and modifications may be made therein without departing from the spirit and scope of the present invention as claimed.

What is claimed is:

1. An electrophotographic copying machine including:
   a document table having a support surface for supporting a first document to be copied;
   a document drum for receiving and winding a second sheet-like document thereon to be copied positioned at the same level of the support surface of said document table;
   a substantially planar reciprocating light scanning source positioned relative to each of said document drum and document table so that by selective movement of said light scanning source either of said first or second documents can be scanned by said light scanning source, said light scanning source being positioned when not in operation between said document table and said drum with said document drum being positioned at one extremity of the range of movement of said light scanning source; and
   selection means for operating said light scanning source to selectively scan either of said first or said second documents.

2. The machine of claim 1, wherein said document drum means comprises a document drum for winding said document thereon and an electrode means disposed on said document drum for receiving a DC voltage.

3. The machine of claim 2, wherein said electrode means comprises a plurality of positive and negative interdigital electrodes longitudinally extending from both ends of said document drum means.

4. The machine of claim 3, wherein said positive and negative interdigital electrodes are printed.

5. The machine of claim 4, wherein said positive and negative interdigital electrodes are coated with a synthetic resin.

6. The machine of claim 3, further comprising brush means including electrically conductive low resistance fibers supplying the DC voltage to the positive and negative interdigital electrodes.

7. The electrophotographic copying machine of claim 1, wherein said reciprocating light source is reciprocated between a pair of micro-switches during scanning said document on said document table and is fixed at a third microswitch when scanning said sheet-like document on said document drum.

8. The electrophotographic copying machine of claim 1, wherein said document drum rotates in unison with a photoreceptor responsive to said light scanning source for forming an electrostatic latent image on said photoreceptor of either said document on said drum or said document on said document table.

9. The electrophotographic copying machine of claim 1, wherein said document drum includes an electrode means disposed on said document drum for applying a DC voltage to the surface of said drum such that said document is electrostatically attracted to and tightly wound on said drum.

10. The electrophotographic copying machine of claim 9, wherein said electrode means comprises a plurality of positive and negative interdigital electrodes longitudinally extending from both ends of said document drum.

11. The electrophotographic copying machine of claim 10, wherein said positive and negative interdigital electrodes are printed.

12. The electrophotographic copying machine of claim 11, wherein said positive and negative interdigital electrodes are coated with a synthetic resin.

13. The electrophotographic copying machine of claim 10, further comprising brush means including electrically conductive low resistance fibers supplying DC voltage to the positive and negative interdigital electrodes.

14. The electrophotographic copying machine of claim 1, wherein said document drum further includes supply roller means for forwarding said second document onto said document drum, and roller means for separating said second document from said document drum.

* * * * *